US007357565B2

(12) United States Patent
Gopalan et al.

(10) Patent No.: US 7,357,565 B2
(45) Date of Patent: Apr. 15, 2008

(54) FLUID INJECTOR AND MIXER APPARATUS

(75) Inventors: Shridhar Gopalan, Westminster, MD (US); Shawn Martin, Annapolis, MD (US); Alan S. Romack, Columbia, MD (US)

(73) Assignee: Bowles Fluidics Corporation, Columbia, MD (US)

( * ) Notice: Subject to any disclaimer, the term of this patent is extended or adjusted under 35 U.S.C. 154(b) by 532 days.

(21) Appl. No.: 11/015,881

(22) Filed: Dec. 17, 2004

(65) Prior Publication Data

US 2005/0133615 A1 Jun. 23, 2005

Related U.S. Application Data

(60) Provisional application No. 60/530,843, filed on Dec. 18, 2003.

(51) Int. Cl.

| | |
|---|---|
| ***B01F 3/04*** | (2006.01) |
| ***B01F 15/02*** | (2006.01) |
| *F02M 47/02* | (2006.01) |
| *F02M 59/00* | (2006.01) |
| *F02M 39/00* | (2006.01) |
| *F02C 1/00* | (2006.01) |

(52) U.S. Cl. .............................. 366/163.2; 366/174.1; 239/88; 239/533.2; 239/533.3

(58) Field of Classification Search ............ 366/163.2, 366/163.1, 167.1, 174.1; 239/88, 533.2, 239/533.3

See application file for complete search history.

(56) References Cited

U.S. PATENT DOCUMENTS

| | | | | |
|---|---|---|---|---|
| 2,361,150 | A | 10/1944 | Petroe | |
| 3,799,195 | A | 3/1974 | Hermann | 137/553 |
| 4,123,800 | A | 10/1978 | Mazzei | 366/150 |
| 4,210,166 | A * | 7/1980 | Munie | 137/271 |
| 4,248,692 | A * | 2/1981 | Knebel et al. | 208/432 |
| 4,344,752 | A | 8/1982 | Gallagher | 431/354 |
| 4,597,671 | A * | 7/1986 | Marelli | 366/127 |
| 4,625,916 | A * | 12/1986 | Nieuwkamp et al. | 239/431 |
| 4,765,373 | A * | 8/1988 | Munroe | 137/890 |
| 5,298,198 | A * | 3/1994 | LaCrosse | 261/76 |

(Continued)

*Primary Examiner*—Tony G Soohoo
(74) *Attorney, Agent, or Firm*—Larry J. Guffey

(57) ABSTRACT

An improved injector which mixes a secondary fluid into a carrier fluid stream has (a) a body for directing the flow of the carrier fluid, this body having an internal wall forming a flow passage therethrough, a central axis, an inlet, an outlet, and a port for receiving the secondary fluid that is mixed with the carrier fluid, (b) a ramp-like restriction portion which is located downstream of the body's inlet and upstream of the secondary fluid port and configured so as to decrease the effective cross-sectional area of the flow passage in the direction of the flow of the carrier fluid, (c) a ramp-like expansion portion which is located downstream of the secondary fluid port and upstream of the body's outlet and configured so as to increase the effective cross-sectional area of the flow passage in the direction of the flow of the carrier fluid, (d) a throat portion which is situated between the restriction and expansion portions, and (e) a cavity in the throat that extends from its internal wall and into the body, with the port entering the flow passage at a location in the throat cavity, and wherein this cavity is configured so to promote a vortical flow of the secondary fluid in the cavity.

14 Claims, 5 Drawing Sheets

U.S. PATENT DOCUMENTS

| | | | | |
|---|---|---|---|---|
| 5,425,581 | A * | 6/1995 | Palm | 366/339 |
| 5,674,312 | A | 10/1997 | Mazzei | 95/261 |
| 5,743,637 | A | 4/1998 | Ogler | 366/163.2 |
| 5,860,451 | A * | 1/1999 | Raleigh et al. | 137/888 |
| 5,863,128 | A | 1/1999 | Mazzei | 266/163.2 |
| 6,173,526 | B1 | 1/2001 | Mazzei | 47/48.5 |
| 6,986,832 | B2 * | 1/2006 | Lamminen et al. | 162/381 |
| 2005/0133615 | A1 * | 6/2005 | Gopalan et al. | 239/88 |

* cited by examiner

USPN 4,123,800

USPN 4,123,800

USPN 4,123,800

USPN 5,674,312

USPN 5,674,312

FLUID INJECTOR AND MIXER APPARATUS

CROSS-REFERENCE TO RELATED APPLICATION

This application claims the benefit of U.S. Provisional Patent Application No. 60/530,843, filed Dec. 18, 2003 by Shridhar Gopalan and Shawn Martin.

BACKGROUND OF THE INVENTION

1. Field of the Invention

This invention relates to fluid handling processes and apparatus. More particularly, this invention relates to a method and an apparatus for mixing gas or other fluids into a liquid stream.

2. Description of the Related Art

The injection of liquids into liquid streams using an injector is well-known. Such systems are widely used in the agricultural field to inject fertilizers and insecticides into a pressurized water stream of irrigation systems. Injectors for such irrigation applications have long been known. For example, see FIGS. 1-3 from U.S. Pat. No. 4,123,800 to Mazzei which show, respectively, a cross-sectional, outlet axial and inlet axial views of such an injector.

The injector shown here is characterized by having general axial symmetry and being shaped like a Venturi tube with a throat area near its inlet. It also has an annular ring or chamber (see 26 in FIG. 3) that surrounds the device's throat, with this ring having ports (see 40 in FIG. 3) through which an additive liquid can be entrained into the carrier liquid passing through the injector. Grooves (see 35 in FIG. 2) in the downstream portion of the injector serve to add swirl to the flow and aid in mixing the additive and carrier liquids.

Over the years it has been learned that an injector of this type is also suitable for adding gases to a liquid stream. See FIGS. 4 and 5 from U.S. Pat. No. 5,674,312 to Angelo Mazzei. Again, we see that this air-liquid injector is also characterized by having general axial symmetry and being shaped like a Venturi tube with a throat area near its inlet. It also has an annular ring or chamber that surrounds the device's throat, with this ring having ports or a groove through which a gas can be entrained into the carrier liquid passing through the injector.

Examples of gases which can usefully be injected into liquids are air, chlorine, oxygen, and ozone. Applications vary from small installations such as home spas and swimming pools to city and regional water supplies, as well as to irrigation systems and aquaculture applications.

The injection of these gases, while beneficial for their intended chemical effects (e.g., ozone into water helps to sanitize the water), is not without some possible complications. For example, the discharge of ozone into the atmosphere is very strictly regulated. Thus, when ozone is injected into water, only small amounts of any excess ozone, which is not dissolved in the water, are permitted to be discharged into the atmosphere. Thus, in water treatment systems, better ozone in water mixing methods and apparatus are always desirable.

Examples of other prior art injectors are found in U.S. Pat. Nos. 2,361,150, 3,799,195, 4,344,752, 5,743,637, 5,863,128 and 6,173,526.

Despite much prior art relating to such liquid-liquid and gas-liquid injectors, there still exists a need for further technological improvements with respect to these devices.

3. Objects and Advantages

There has been summarized above, rather broadly, the prior art that is related to the present invention in order that the context of the present invention may be better understood and appreciated. In this regard, it is instructive to also consider the objects and advantages of the present invention.

It is an object of the present invention to provide a gas-liquid injector which can operate at higher mixing and gas dissolution efficiencies than other competitive devices.

It is another object of the present invention to provide a gas-liquid injector that causes minimal pressure losses in the carrier liquids that flow through it.

It is yet another object of the present invention to provide a gas-liquid injector that can operate so as to allow higher suction pressures to be used to draw gas into the liquid.

These and other objects and advantages of the present invention will become readily apparent as the invention is better understood by reference to the accompanying summary, drawings and the detailed description that follows.

SUMMARY OF THE INVENTION

Recognizing the need for the development of improved means and methods for mixing fluids into liquid streams, the present invention is generally directed to satisfying the needs set forth above and overcoming the disadvantages identified with prior art devices and methods.

In accordance with the present invention, the foregoing needs can be satisfied by providing an injector which mixes a secondary fluid into a carrier fluid stream, with a preferred embodiment of this injector including the following elements: (a) a body for directing the flow of the carrier fluid, this body having an internal wall forming a flow passage therethrough, with this flow passage having a central axis, an inlet, an outlet, and a port for receiving the secondary fluid that is mixed with the carrier fluid, (b) a ramp-like restriction portion in the flow passage, with this restriction located downstream of the body's inlet and upstream of the secondary fluid port and configured so as to decrease the effective cross-sectional area of the flow passage in the direction of the flow of the carrier fluid, (c) a ramp-like expansion portion in the flow passage, with this expansion located downstream of the secondary fluid port and upstream of the body's outlet and configured so as to increase the effective cross-sectional area of the flow passage in the direction of the flow of the carrier fluid, (d) a throat portion in the flow passage, with this throat situated between the restriction and expansion portions and having a cross-sectional area that is less than the cross-sectional area of the body's inlet, and (e) a cavity in the throat that extends from its internal wall and into the body, with the port entering the flow passage at a location in the throat cavity, and wherein the cavity configured so to promote a vortical flow of the secondary fluid in the cavity.

Additionally, in another preferred embodiment the restriction and expansion portions are configured so as to provide for a minimal pressure loss of the carrier fluid as it flows through the injector and the throat portion has a cross-sectional area that is in the range of 28-72 percent of the cross-sectional area of the passage's inlet.

Thus, there has been summarized above, rather broadly, the present invention in order that the detailed description that follows may be better understood and appreciated. There are, of course, additional features of the invention that will be described hereinafter and which will form the subject matter of the claims to this invention.

DESCRIPTION OF THE PREFERRED EMBODIMENT

Figure 1:
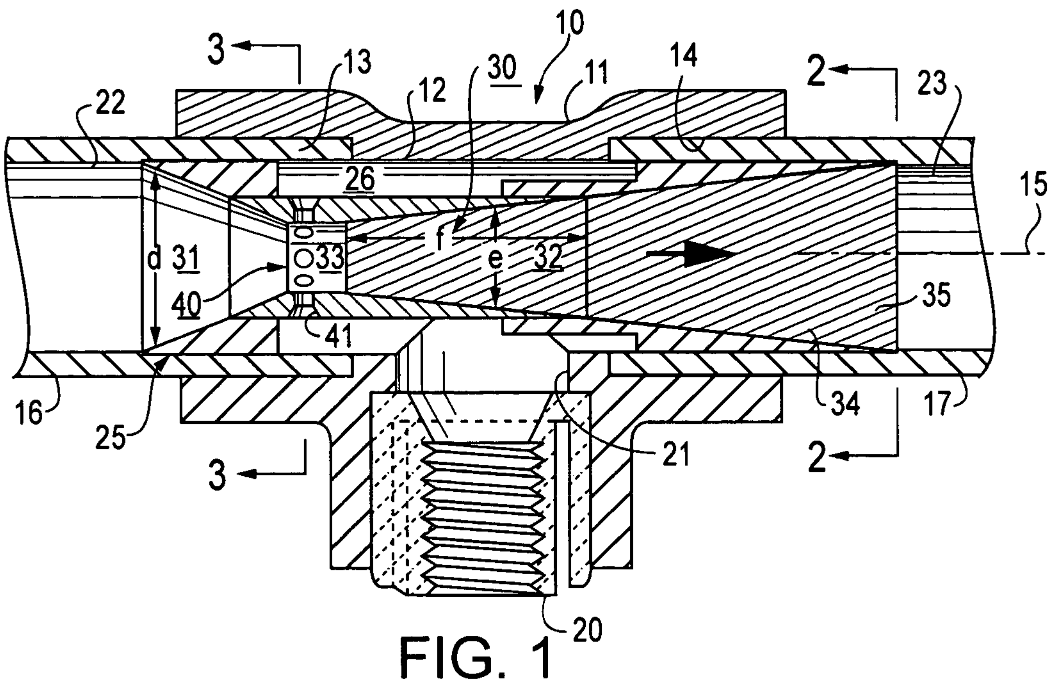
FIG. 1 PRIOR ART
FIG. 1 illustrates a cross-sectional view of the liquid-liquid injector disclosed in U.S. Pat. No. 4,123,800.
Figure 2:
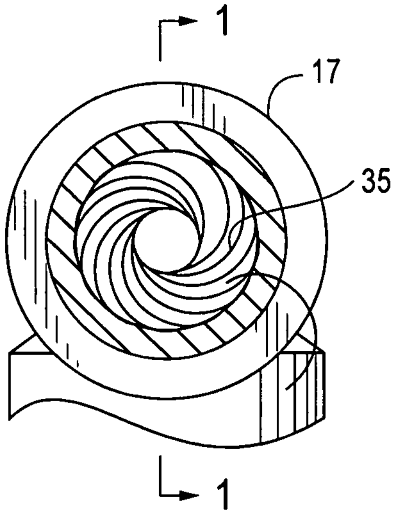
FIG. 2 PRIOR ART
FIG. 2 illustrates the outlet axial view of the liquid-liquid injector shown in FIG. 1.
Figure 3:
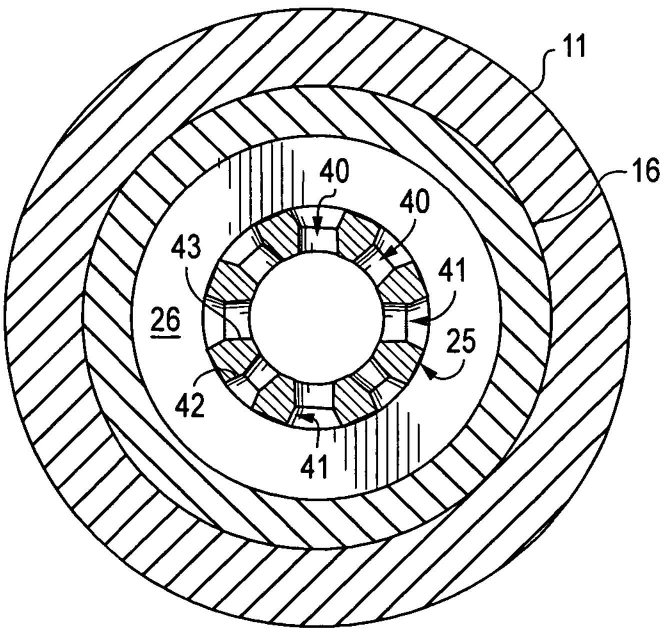
FIG. 3 PRIOR ART
FIG. 3 illustrates the inlet axial view of the liquid-liquid injector shown in FIG. 1.

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways.

Also, it is to be understood that the phraseology and terminology employed herein are for the purpose of description and should not be regarded as limiting. For example, the discussion herein below generally relates to water and air mixing techniques; however, it should be apparent that the inventive concepts described herein are applicable also to the mixing of other fluids.

The present invention involves methods and devices for injecting a gas into a liquid with minimal pressure losses through the injector and with maximum gas-liquid mixing and dissolution of the gas in the liquid.

Figure 6:
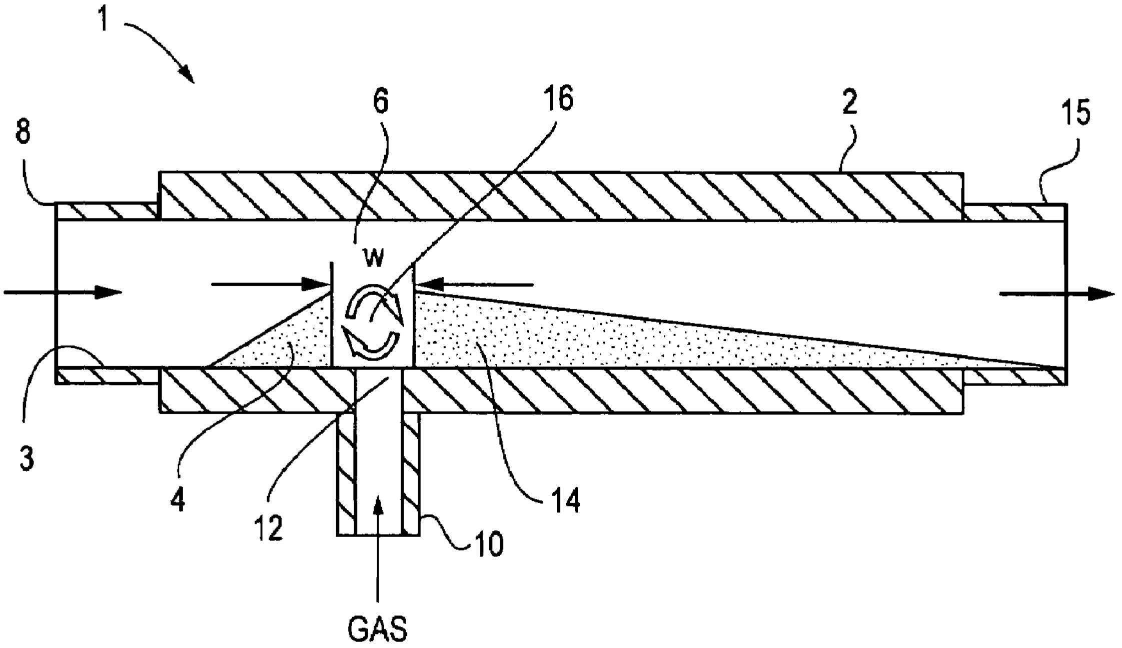
FIG. 6 illustrates a cross-sectional view of a preferred embodiment of a fluid-liquid injector of the present invention.

FIG. 6 illustrates a cross-sectional view of a preferred embodiment of a gas-liquid injector 1 version of the present invention. It is seen to consist of a cylindrical flow tube 2 having an internal wall 3 which has a ramp-like restriction or obstruction 4 which comes forth from a portion of the internal wall so as to block flow through the bottom part of the tube and reduces the effective diameter of the tube so that it has an effective throat 6 at a specified axial distance from the tube's inlet 8. In the throat area of the tube, a gas or secondary fluid inlet pipe 10 connects to the bottom of the tube and provides a port 12 where a gas or other secondary fluid may be entrained into the carrier liquid flowing through the tube.

Downstream of this port 12 there exists a ramp-like, expansion insert 14 which comes forth from a portion of the tube's internal wall so as allow the effective diameter of the tube to expand from its restricted value at the throat 6 to what it eventually becomes at the tube's outlet 15, which will typically be of the same approximate size as the tube's inlet 8. Between the restriction ramp 4 and the expansion ramp 14 and thus in the throat portion of the injector is a cavity 16 which proves to be vital to promote the enhanced fluid mixing capabilities of this invention. It is in the bottom of this cavity that the pipe's port 12 is located.

Figure 4:
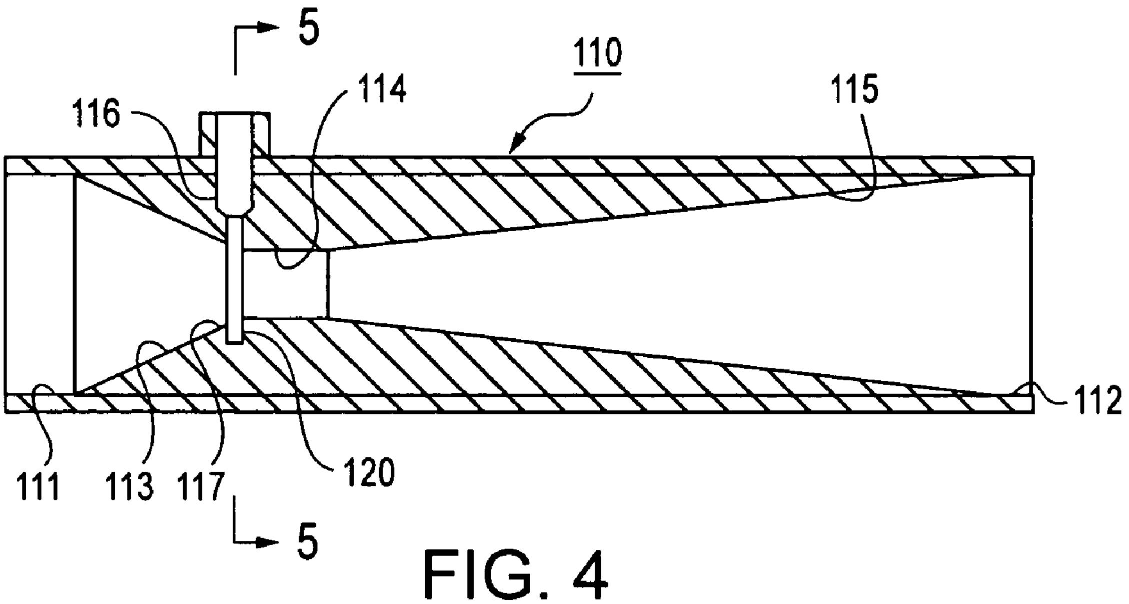
FIG. 4 PRIOR ART
FIG. 4 illustrates a cross-sectional view of the gas-liquid injector disclosed in U.S. Pat. No. 5,674,312.
Figure 5:
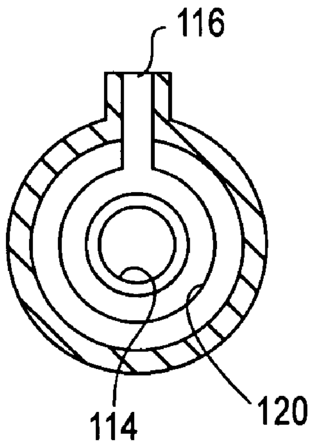
FIG. 5 PRIOR ART
FIG. 5 illustrates the inlet axial view of the gas-liquid injector shown in FIG. 4.

It should be noted that these restriction 4 and expansion 14 ramps yield a non-axially symmetric flow tube 2 which is quite different than that seen in the typical Venturi style injectors which are axially symmetric as seen in FIGS. 1 and 4. This non-symmetric geometry of the present invention is necessary in order that the cavity 16 can be sized so as to give adequate fluid mixing in this cavity before the flow in the cavity is swept into the primary stream of the carrier fluid.

To minimize pressure losses through the present invention, it has been found that the angle formed by the inlet ramp-like obstruction 4 and the tube's inner wall should be in the range of 25-35 degrees for a large range of Reynolds numbers flows through the tube. A preferred angle is 30 degrees. Alternatively, this inlet ramp can be configured so as to give a desired specified pressure loss in the carrier liquid.

Similarly, the angle formed by the face of the expansion ramp or insert 14 and the tube's inner wall is generally in the range of 2-8 degrees, with a preferred embodiment having an angle of 4 degrees.

Figure 7:
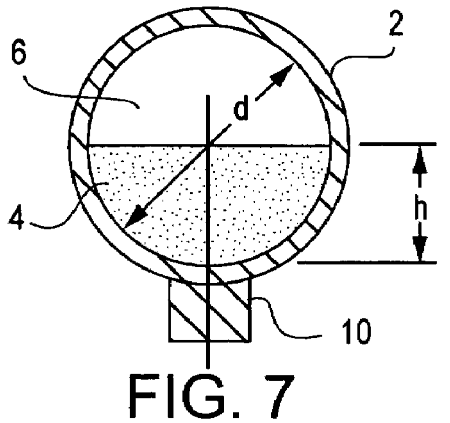
FIG. 7 illustrates an inlet axial view of the injector shown in FIG. 6.

FIG. 7 illustrates an inlet axial view of gas-liquid injector 1 shown in FIG. 6. The top of the obstruction 4 is seen to form a straight line that is perpendicular to the axis if the pipe 10 by which gas enters the tube. The height, h, of this obstruction to the inside diameter, d, of the tube 2 is in the range of 30%-70%, with a preferred embodiment having a value of approximately 65%. Alternatively, the cross-sectional area of the tube at the end of the inlet's restriction ramp is in the range of 28%-72% of the tube's cross-sectional area at its inlet, with a preferred value of 30%.

The ratio of the width, w, of the cavity 16 to the inside diameter, d, of the tube 2 is in the range of 100-200%, with a preferred embodiment having a value of approximately 100%. The size of this cavity 16 is essentially independent of the size or diameter of the gas inlet port 12. If it is approximately 100% of the tube diameter, sufficient room is provided in the cavity 16 to allow a mixing vortex to be set up at the point where the gas enters the tube 2. This mixing vortex serves to maximize mixing by breaking up the incoming gas to form a multiphase fluid medium in the cavity 16.

The velocity of the carrier fluid is maximum at the tube's throat 6 or just above the cavity 16 which results in a point of minimal pressure in the liquid (less than atmospheric pressure) which allows gas to enter the cavity 16. A complex, three-dimensional vortical flow of liquid and gas is set up inside the cavity 16. This cavity flow acts as a large-scale mixer for the entering gas.

The interface between the carrier liquid free-stream and the top of the cavity 16 is characterized by a strong shear layer. Any gas or fluid transferred from the cavity 16 to the free-stream has to pass through this shear layer. The high velocity gradients in this shear layer serve to significantly breakup the gas bubbles entrained into the shear layer from the cavity 16.

The resultant smaller-sized gas bubbles greatly increase the surface area of the gas-liquid interface which aids gas dissolution into the liquid. This is the key to the present invention's attainment of higher dissolved gas concentrations in the liquid and a reduction in out-gassing of the entrained gas.

Figure 8:
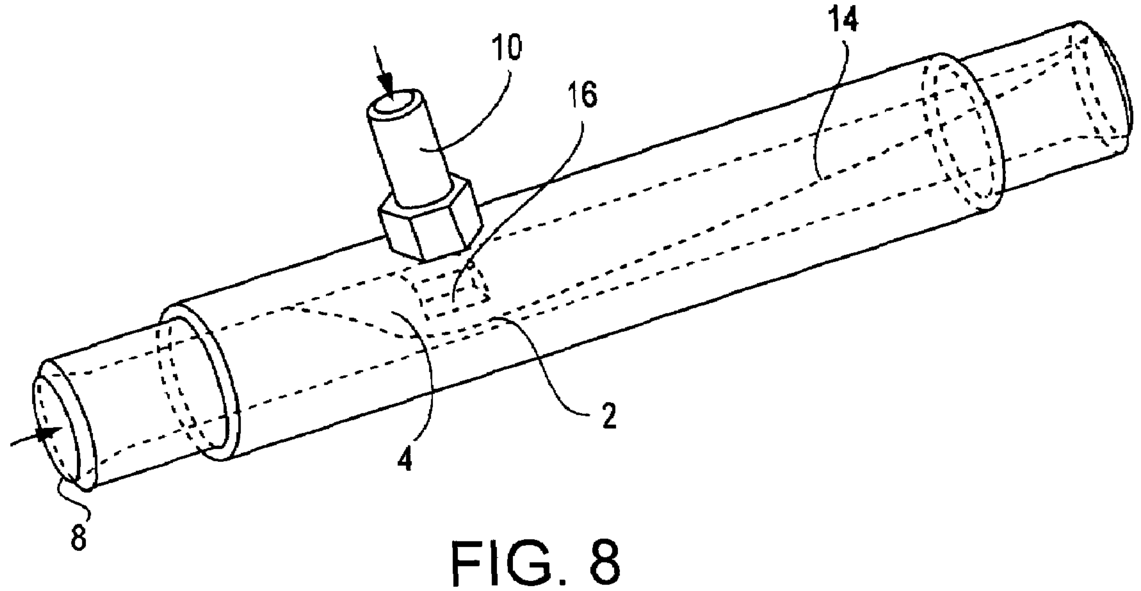
FIG. 8 provides a perspective view of a preferred embodiment of the present invention.

FIG. 8 provides a perspective view of a preferred embodiment of the present invention.

Figure 9:
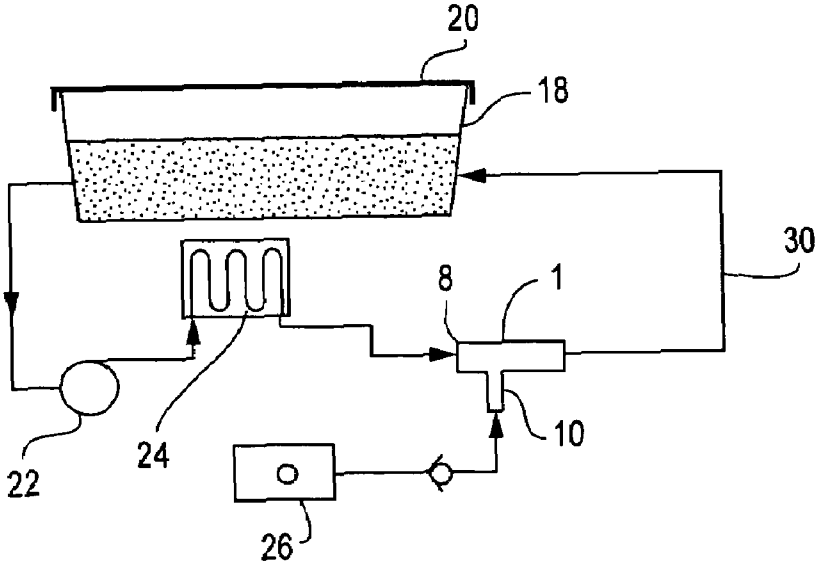
FIG. 9 is a schematic diagram of the piping layout for experiments conducted with an embodiment of the present invention which is used to introduce ozone into the circulation water of a residential spa.

An embodiment of the present invention has shown itself to be especially effective at mixing ozone into a water stream, as in the situation where ozone addition is being used to help sanitize the circulating water in a spa. FIG. 9 shows a schematic diagram of the piping layout for experiments conducted with an embodiment 1 of the present invention which is used to introduce ozone into the circulating water of a residential spa 18. In this experiment, a cover 20 is placed over the spa 18 so that the out-gassing from the ozone can be captured and measured using an electrochemical gas diffusion type sensor. The dissolved content of ozone in the spa water is measured using a polargraphic membrane sensor specific to molecular ozone. A pump 22 is seen to circulate water through a water heater 24 and into the liquid inlet 8 of an injector 1 that draws ozone from an ozone generator 26 and then feeds this mixture through the system's piping 28 and into the spa 18.

Figure 10:
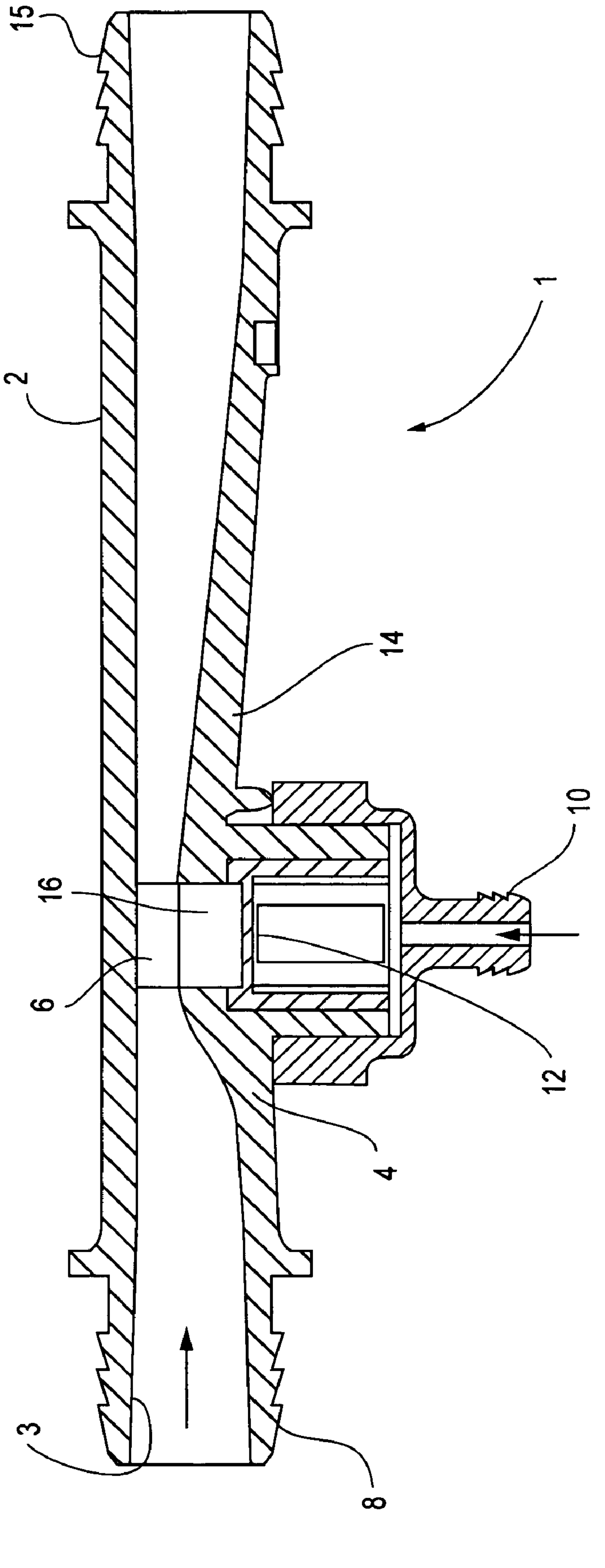
FIG. 10 is a cross-sectional view of a preferred embodiment of the present invention in which it is used to mix ozone into a liquid stream.

The embodiment of the present invention in the form of an ozone injector for spa applications is shown in FIG. 10. It is made from a three-piece construction of injection molded plastic and is sized so that it has a 0.75 inch water inlet and outlet, a 0.25 inch ozone inlet, a throat area that is restricted to approximately 30% of its inlet diameter, a cavity whose width, w, is approximately equal to the tube's inlet diameter and an overall length of approximately 6.5 inches which allows for approximately 0.75 inches of barbed surface at each end of the tube for connecting slip-on inlet and outlet piping lines.

Other embodiments of the present invention can be designed as rather obvious variations of those presented herein so as to be particularly well-suited to a vast number of fluid mixing operations. Some of the more notable of these include the fluid mixing tasks associated with: (a) residential water treatment systems, (b) field-erected, water cooling systems, (c) aquaculture systems, (d) the water handling systems of aquarium and water parks, (e) ballast water treatment systems, (f) beverage processing operations, (g) the fluid flow systems of bleaching operations, (h) assorted chemical manufacturing processes, (i) "Clean-in-Place" apparatuses which utilize various fluid flow systems, (j) cyanide regeneration processes, (k) the water circulations systems of swimming pools, (l) the fluid flow aspects of Biological Oxygen Demand (BOD) and Chemical Oxygen Demand (COD) systems, and (m) the fluid flow aspects of organic material control in wastewater systems.

Although the foregoing disclosure relates to preferred embodiments of the invention, it is understood that these details have been given for the purposes of clarification only. Various changes and modifications of the invention will be apparent, to one having ordinary skill in the art, without departing from the spirit and scope of the invention as will eventually be set forth in the claims of the regular patent application which will claim the benefit of this earlier filing.

We claim:

1. A fluid injector having improved fluid mixing capabilities, said injector comprising:

a body for directing the flow of a carrier fluid, said body having an internal wall forming a flow passage therethrough, said flow passage having a central axis, an inlet, an outlet, and a port for receiving a secondary fluid that is mixed with said carrier fluid, a ramp-like restriction located downstream of said inlet and upstream of said port and extending from said body internal wall so as to decrease the effective cross-sectional area of said flow passage in the direction of the flow of said carrier fluid, said restriction having a downstream end at which is located a rear surface that extends abruptly down to said flow passage internal wall, a ramp-like expansion located downstream of said port and upstream of said outlet and extending from said body internal wall so as to increase the effective cross-sectional area of said flow passage in the direction of the flow of said carrier fluid, said expansion having an upstream end at which is located a front surface that extends abruptly upward from said flow passage internal wall, wherein said restriction and expansion being situated on said internal wall so as to form between said restriction rear surface and expansion front surface a cavity, and wherein said port located in said cavity.

2. The fluid injector as recited in claim 1, wherein:

said restriction having a portion that slopes with respect to the inlet portion of said passage internal wall at an angle in the range of 25-35 degrees, and said cavity having an effective width of "w", and said flow passage having an effective inlet diameter of "d", and the ratio of "w/d" is in the range of 100-200%.

3. The fluid injector as recited in claim 2, wherein:

said expansion having a portion that slopes with respect to the outlet portion of said passage internal wall at an angle in the range of 2-8degrees.

4. The fluid injector as recited in claim 2, wherein:

the cross-sectional area of said flow passage at the location of said expansion downstream end is in the range of 28-72percent of said cross-sectional area of said passage inlet.

5. The fluid injector as recited in claim 1, wherein:

said expansion having a portion that slopes with respect to the outlet portion of said passage internal wall at an angle in the range of 2-8degrees, and said cavity having an effective width of "w", and said flow passage having an effective inlet diameter of "d", and the ratio of "w/d" is in the range of 100-200%.

6. The fluid injector as recited in claim 1, wherein:

the cross-sectional area of said flow passage at the location of said expansion downstream end is in the range of 28-72percent of said cross-sectional area of said passage inlet, and said cavity having an effective width of "w", and said flow passage having an effective inlet diameter of "d", and the ratio of "w/d" is in the range of 100-200%.

7. The fluid injector as recited in claim 1, wherein:

said cavity having an effective width of "w" and an effective depth of "h", and said flow passage having an effective inlet diameter of "d", the ratio of "w/d" is in the range of 100-200%, and the ratio of "hid" is in the range of 30-70%.

8. A method for injecting a secondary fluid into a carrier fluid that flows through a body that directs the flow of said carrier fluid, said body having an internal wall forming a flow passage therethrough, said flow passage having a central axis, an inlet, an outlet, and a port for receiving said secondary fluid that is mixed with said carrier fluid, said method comprising the steps of:

providing a ramp-like restriction located downstream of said inlet and upstream of said port and extending from said body internal wall so as to decrease the effective cross-sectional area of said flow passage in the direction of the flow of said carrier fluid, said restriction having a downstream end at which is located a rear surface that extends abruptly down to said flow passage internal wall, providing a ramp-like expansion located downstream of said port and upstream of said outlet and extending from said body internal wall so as to increase the effective cross-sectional area of said flow passage in the direction of the flow of said carrier fluid, said expansion having an upstream end at which is located a front surface that extends abruptly upward from said flow passage internal wall, wherein said restriction and expansion being situated on said internal wall so as to form between said restriction rear surface and expansion front surface a cavity, and wherein said port located in said cavity.

9. The method as recited in claim 8, wherein:

said restriction having a portion that slopes with respect to the inlet portion of said passage internal wall at an angle in the range of 25-35 degrees, and said cavity having an effective width of "w", and said flow passage having an effective inlet diameter of "d", and the ratio of "w/d" is in the range of 100-200%.

10. The method as recited in claim 9, wherein:

said expansion having a portion that slopes with respect to the outlet portion of said passage internal wall at an angle in the range of 2-8 degrees.

11. The method as recited in claim 9, wherein:

the cross-sectional area of said flow passage at the location of said expansion downstream end is in the range of 28-72percent of said cross-sectional area of said passage inlet.

12. The method as recited in claim 8, wherein:

said expansion having a portion that slopes with respect to the outlet portion of said passage internal wall at an angle in the range of 2-8degrees, and said cavity having an effective width of "w", and said flow passage having an effective inlet diameter of "d", and the ratio of "w/d" is in the range of 100-200%.

13. The method as recited in claim 12, wherein:

said cavity having an effective width of "w" and an effective depth of "h", and said flow passage having an effective inlet diameter of "d", the ratio of "w/d" is in the range of 100-200%, and the ratio of "h/d" is in the range of 30-70%.

14. The method as recited in claim 8, wherein:

the cross-sectional area of said flow passage at the location of said expansion downstream end is in the range of 28-72percent of said cross-sectional area of said passage inlet, and said cavity having an effective width of "w", and said flow passage having an effective inlet diameter of "d", and the ratio of "w/d" is in the range of 100-200%.

* * * * *